Patented Aug. 19, 1947

2,425,976

UNITED STATES PATENT OFFICE 2,425,976

PROCESS OF PREPARING CEMENT POWDERS AND ACIDPROOF MORTARS

Karl Dietz, Kronberg in Taunus, Germany; vested in the Attorney General of the United States No Drawing. Application February 26, 1941, Serial No. 380,605. In Germany February 9, 1940

14 Claims. (Cl. 106—84)

The present invention relates to cement powders, acid-proof mortars and a process of preparing them, as well as to containers lined with acid-proof bricks and acid-proof mortars.

Generally, there have been employed, for the acidproof lining of receptacles, acid- and waterproof, liquid-tight water-glass cements, which are self-hardening even in the absence of air.

These cements are obtained by mixing cement powders with alkali silicates. The latter may be employed either as aqueous solutions or in pulverulent form. When the alkali silicate is employed in pulverulent form, it will usually be admixed in the cement powders. Thus, the cement powders, containing the pulverulent alkali silicate and generally termed "premixed," can be admixed with water to form acid-proof mortars. When the alkali silicate is employed in solution, the solid components of the cement powder, which comprise an alkali-reactive substance and an inert filling material, are admixed directly into the silicate solution to form acidproof mortars. The self-hardening of these cement mortars is principally due to the presence of such alkali-reactive substances which will react with the alkali of the water-glass to precipitate the silicic acid thereof. Such alkali-reactive substances are described, for example, in U. S. Patents Nos. 1,867,444, and 1,881,180. Other self-hardening acidproof cements are known.

It has already been ascertained that the inner lining, of pressure apparatus, or such apparatus which has an outer metal jacket and which is externally heated, should be under a pressure such that the bricks, of which the lining consists, are firmly and constantly pressed against the said outer jacket even when the latter is exposed to an intensive expansion owing to high operating temperatures and/or pressures. The water-glass cement mortars heretofore employed have a common characteristic which does not allow these to be employed for brick lining of pressure apparatus. These cement mortars are usually found to have shrunk when hardened.

It is an object of this invention to provide cementing compositions which, when mixed with water and/or alkali silicate, will yield an acidproof, self-hardening mortar which, after hardening, will be capable of swelling upon contact with water or aqueous liquids such as acids or brines.

Another object of this invention is to provide acidproof mortars which, when hardened, are capable of swelling in contact with water and aqueous liquids, such as acids or brines, as well as a process of preparing such mortars, imparting to these a regulatable capability of swelling.

A further object of this invention is to provide containers lined with acidproof bricks, set in acidproof mortars wherein the lining is under a special and constant pressure which will continuously force the lining against the jackets of such containers even when these are exposed to intensive expansion owing to high pressure or high temperature. According to this invention, it is possible to exactly regulate the capability of swelling of an acidproof cement by adding thereto small quantities of slags which are obtained in producing and processing metals and metal alloys. There have proved to be especially suitable the slags obtained in the production of iron, that is to say, blast furnace slag, Thomas slag, acid and basic slags or foundry slag whose composition may be characterized by a content of about 30–55 per cent of $SiO_2$, 15–45 per cent of $CaO$ and 1–25 per cent of $Al_2O_3+Fe_2O_3$. The slags are added to the cement powders in a finely ground state and in a quantity of about 5–20 per cent thereof. The acid-proof mortars are capable of swelling not only in contact with water but also in contact with aqueous liquids such as acids or brines.

The following example serves to illustrate the invention but it is not intended to limit it thereto; the parts are by weight:

A cement powder is prepared by mixing 61 parts of powdered quartz, 4 parts of ground siliceous sinter, 6.5 parts of clay, 2.5 parts of $K_2SiF_6$, 5 parts of $Na_2SiF_6$, 1 part of $CaSiF_6$ and 20 parts of powdered blast furnace slag with about 34 per cent of $SiO_2$, 41 per cent of $CaO$ and 18.6 per cent of $Al_2O_3+Fe_2O_3$. A mortar is prepared by mixing the cement powder with sodium silicate solution, the proportion of $Na_2O$ to $SiO_2$ to $H_2O$ being 1:2.65:4.66. The hardened mortar mass, when stored in acids, shows a swelling of 1%.

I claim:

1. A process of producing acid-proof, self-hardening mortars which after hardening are capable of swelling in contact with water which comprises mixing an acid-proof filling material, a metal compound which by reaction with the alkali of water-glass precipitates silicic acid and a finely ground slag obtained in producing and processing metal alloys with an alkali metal silicate and water.

2. A process of producing acid-proof, self-hardening mortars which after hardening are capable of swelling in contact with water which comprises mixing an acid-proof filling material, a metal compound which by reaction with the alkali of water-glass precipitates silicic acid and a finely ground slag obtained in producing and processing iron with an alkali metal silicate and water.

3. A process of producing acid-proof, self-hardening mortars which after hardening are capable of swelling in contact with water which comprises mixing an acid-proof filling material, a metal compound which by reaction with the alkali of water-glass precipitates silicic acid and a finely ground slag obtained in producing and processing iron with water-glass solution.

4. A process of producing acid-proof, self-hardening mortars which after hardening are capable of swelling in contact with water which comprises mixing an acid-proof filling material, a silico fluoride and a finely ground slag obtained in producing and processing metals and metal alloys with an alkali metal silicate and water.

5. A process of producing acid-proof, self-hardening mortars which after hardening are capable of swelling in contact with water which comprises mixing an acid-proof filling material, a silico fluoride and a finely ground slag obtained in producing and processing metals and metal alloys with water-glass solution.

6. A cementing composition comprising a dry powdered mixture of a metal compound which by reaction with the alkali of water-glass precipitates silicic acid and a finely ground slag obtained in producing and processing iron, said composition after mixing with an acid-proof filling material and water-glass forming an acid-proof, self-hardening mortar which after hardening is capable of swelling in contact with water.

7. A cementing composition comprising a dry powdered mixture of a metal compound which by reaction with the alkali of water-glass precipitates silicic acid, a finely ground slag obtained in producing and processing iron and an alkali metal silicate, said composition after mixing with an acid-proof filling material and water forming an acid-proof, self-hardening mortar which after hardening is capable of swelling in contact with water.

8. A cementing composition comprising a dry powdered mixture of a silico fluoride and a finely ground slag obtained in producing and processing iron, said composition after mixing with an acid-proof filling material and water-glass forming an acid-proof, self-hardening mortar which after hardening is capable of swelling in contact with water.

9. A cementing composition comprising a dry powdered mixture of a silico fluoride and a finely ground slag obtained in producing and processing iron and an alkali metal silicate, said composition after mixing with an acid-proof filling material and water forming an acid-proof, self-hardening mortar which after hardening is capable of swelling in contact with water.

10. A cementing composition comprising a dry powdered mixture of a silico-fluoride, quartz, a finely ground slag obtained in producing and processing iron, siliceous sinter and an alkali metal silicate, said composition after mixing with water forming an acid-proof, self-hardening mortar capable of swelling in contact with water.

11. A vessel having an outer metal jacket and an inner lining therefor said lining containing acid-proof ceramic units cemented with the acid-proof, self-hardening mortar prepared in accordance with the process of claim 2.

12. A cementing composition comprising a dry powdered mixture of a metal compound which by reaction with the alkali of water-glass precipitates silicic acid; finely-ground slag, obtained in producing and processing iron; and an acid-proof filling material; said composition, after mixing with a water-glass solution, forming an acidproof, self-hardening mortar, which after hardening is capable of swelling in contact with water.

13. A cementing composition comprising a dry powdered mixture of a metal compound which by reaction with the alkali of water-glass precipitates silicic acid; finely-ground slag, having a composition of about 30–55% of $SiO_2$, 15–45% of CaO, and 1–25% of $Al_2O_3+Fe_2O_3$, obtained in the production of iron; and an acidproof filling material; said composition, after mixing with a water-glass solution forming an acidproof, self-hardening mortar which after hardening is capable of swelling in contact with water.

14. A cementing composition comprising a dry powdered mixture containing about 8.5 parts of silico fluoride; 20 parts of powdered blast furnace slag having as approximate composition 34% $SiO_2$, 41% CaO, and 18.6% of $Al_2O_3+Fe_2O_3$; and 65 parts of acidproof filling material consisting of powdered quartz and siliceous sinter; said composition after mixing with a sodium silicate solution, in which the proportion of $Na_2O$ to $SiO_2$ to $H_2O$ is 1:2.65:4.66, forming an acidproof, self-hardening mortar which after hardening is capable of swelling in contact with water.

KARL DIETZ.

REFERENCES CITED

The following references are of record in the file of this patent:

UNITED STATES PATENTS

| Number | Name | Date |
| --- | --- | --- |
| 1,700,346 | Bewley | Jan. 29, 1929 |
| 2,016,796 | Brock et al. | Oct. 8, 1935 |
| 1,867,444 | Dietz et al | July 12, 1932 |
| 1,973,732 | Snell | Sept. 18, 1934 |
| 1,881,180 | Franck et al. | Oct. 4, 1932 |

FOREIGN PATENTS

| Number | Country | Date |
| --- | --- | --- |
| 338,664 | Great Britain | 1930 |
| 437,718 | Great Britain | 1934 |